(12) United States Patent
Shintani

(10) Patent No.: US 8,737,611 B2
(45) Date of Patent: May 27, 2014

(54) ENCRYPTION DEVICE AND MEDIUM, DECRYPTION DEVICE AND METHOD, DATA DELIVERY DEVICE, DATA RECEIVING DEVICE, AND DATA DELIVERY SYSTEM

(75) Inventor: Yoshihiro Shintani, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 745 days.

(21) Appl. No.: 12/289,427

(22) Filed: Oct. 28, 2008

(65) Prior Publication Data

US 2009/0169000 A1    Jul. 2, 2009

(30) Foreign Application Priority Data

Dec. 26, 2007  (JP) ................................. 2007-334998

(51) Int. Cl.
  *H04N 7/167*  (2011.01)
  *G06F 11/30*  (2006.01)
(52) U.S. Cl.
  USPC .......................................... 380/210; 713/189
(58) Field of Classification Search
  USPC .......................................... 380/210; 713/189
  See application file for complete search history.

(56) References Cited

U.S. PATENT DOCUMENTS

| | | | |
|---|---|---|---|
| 6,415,031 B1 * | 7/2002 | Colligan et al. | 380/200 |
| 7,039,938 B2 * | 5/2006 | Candelore | 725/87 |
| 7,360,252 B1 * | 4/2008 | Torrubia-Saez | 726/27 |
| 7,555,129 B2 * | 6/2009 | Yamamoto et al. | 380/277 |
| 2003/0046686 A1 * | 3/2003 | Candelore et al. | 725/31 |
| 2003/0140257 A1 * | 7/2003 | Peterka et al. | 713/201 |
| 2003/0145329 A1 * | 7/2003 | Candelore | 725/87 |
| 2003/0228018 A1 * | 12/2003 | Vince | 380/277 |
| 2005/0097598 A1 * | 5/2005 | Pedlow et al. | 725/31 |
| 2007/0006253 A1 * | 1/2007 | Pinder et al. | 725/31 |
| 2007/0177718 A1 * | 8/2007 | Shimosato et al. | 380/28 |
| 2008/0075285 A1 * | 3/2008 | Poli et al. | 380/211 |

FOREIGN PATENT DOCUMENTS

| | | |
|---|---|---|
| JP | 11-112491 A | 4/1999 |
| JP | 2007-013765 | 1/2007 |

* cited by examiner

*Primary Examiner* — Teshome Hailu
(74) *Attorney, Agent, or Firm* — Rabin & Berdo, P.C.

(57) ABSTRACT

A data delivery device divides data representing a single entity into a plurality of data items, encrypts the data items, and delivers the encrypted data items to a data receiving device. The encryption device in the data delivery device includes a first encryptor that encrypts a first set of the data items, leaving a second set of the data items unencrypted. A storage unit stores the encrypted first set of data items and the unencrypted second set of data items, pending delivery to the data receiving device. A second encryptor encrypts the second set of data items in real time when they are taken from the storage unit and delivered to the data receiving device. By combining pre-encryption and real-time encryption, the encryption device attains a high level of security with only a moderate real-time processing load.

8 Claims, 16 Drawing Sheets

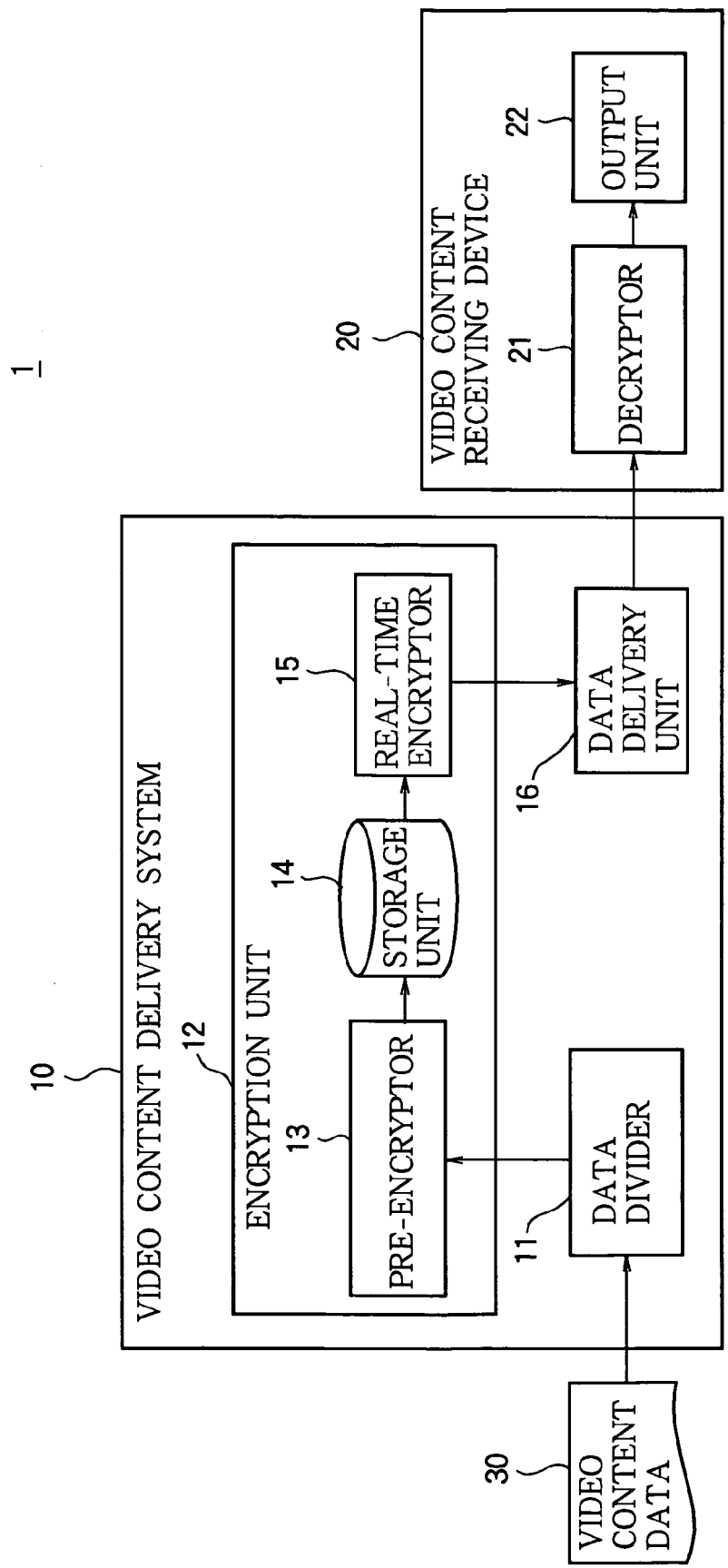

FIG.2

| NAME | NUMBER OF BITS | DESCRIPTION |
|---|---|---|
| Sync_byte | 8 | 0x47 (FIXED) |
| Transport_error_indicator | 1 | ERROR FLAG |
| Payload_unit_start_indicator | 1 | START FLAG |
| Transport_priority | 1 | PRIORITY |
| PID | 13 | PAYLOAD TYPE |
| Tranport_scrambling_control | 2 | ENCRYPTION CONTROL |
| Adaptation_control | 2 | ADAPTATION CONTROL |
| Continuity_counter | 4 | CONTINUITY COUNTER |
| Adaptation_field | — | ADAPTATION DATA |
| Data_byte | — | PAYLOAD |

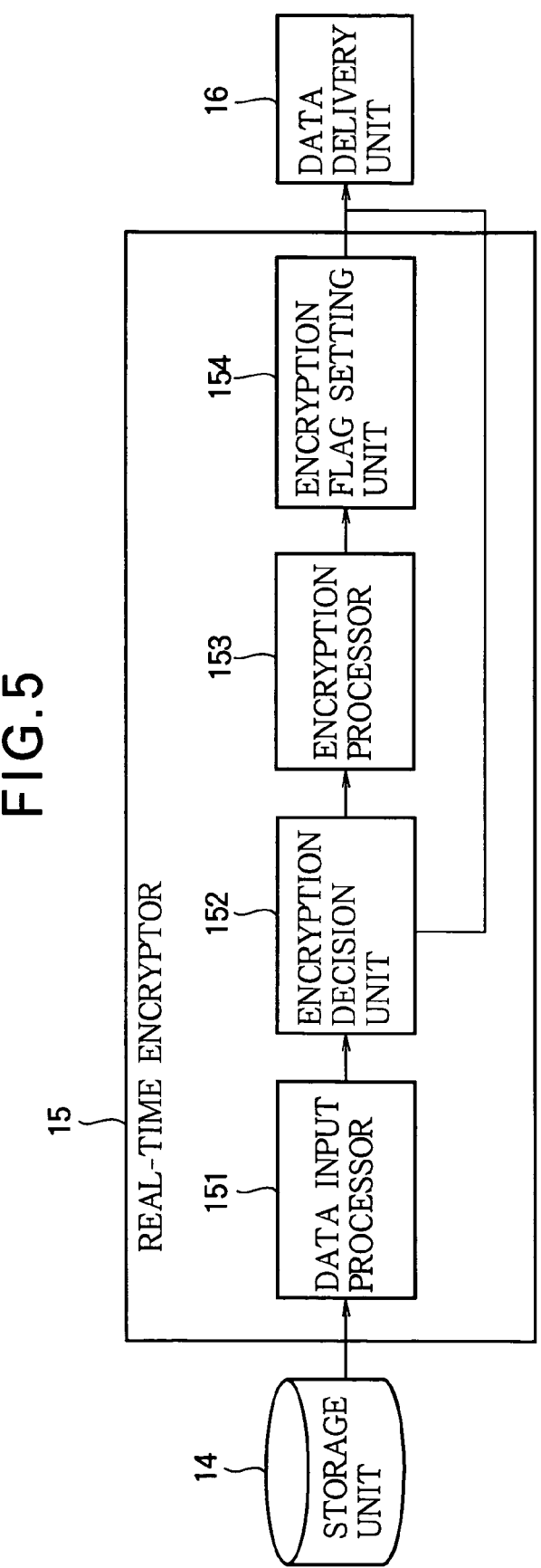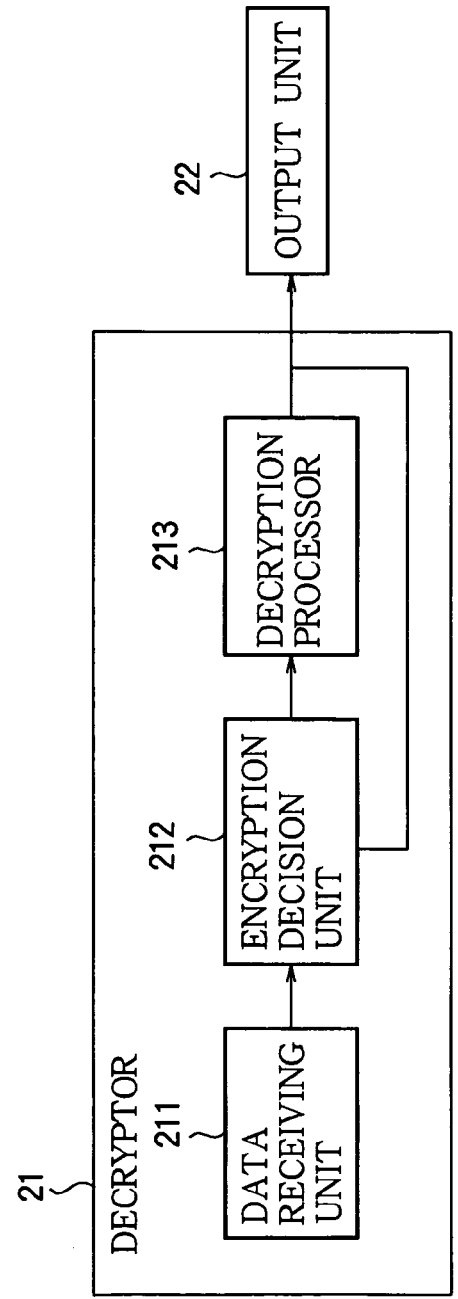

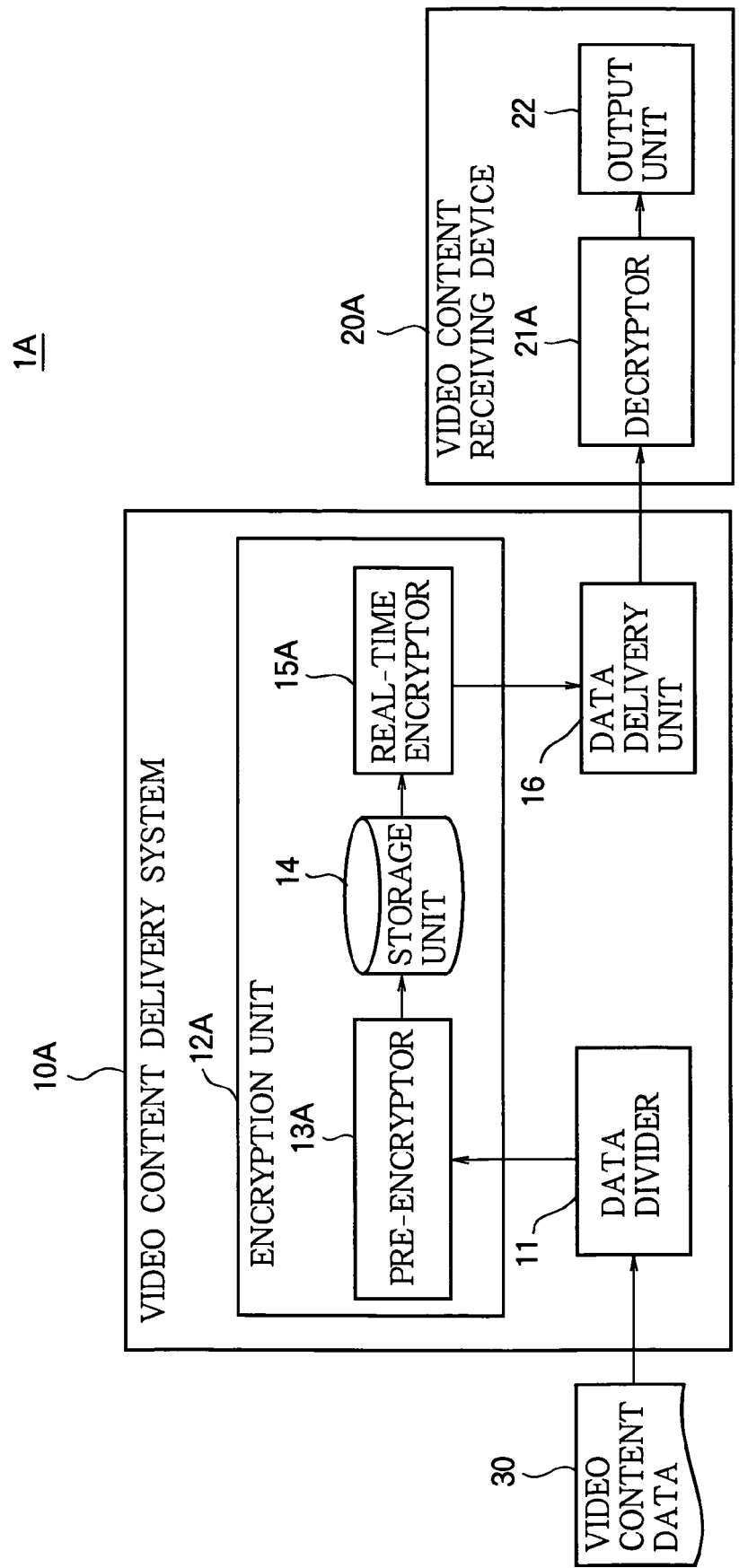

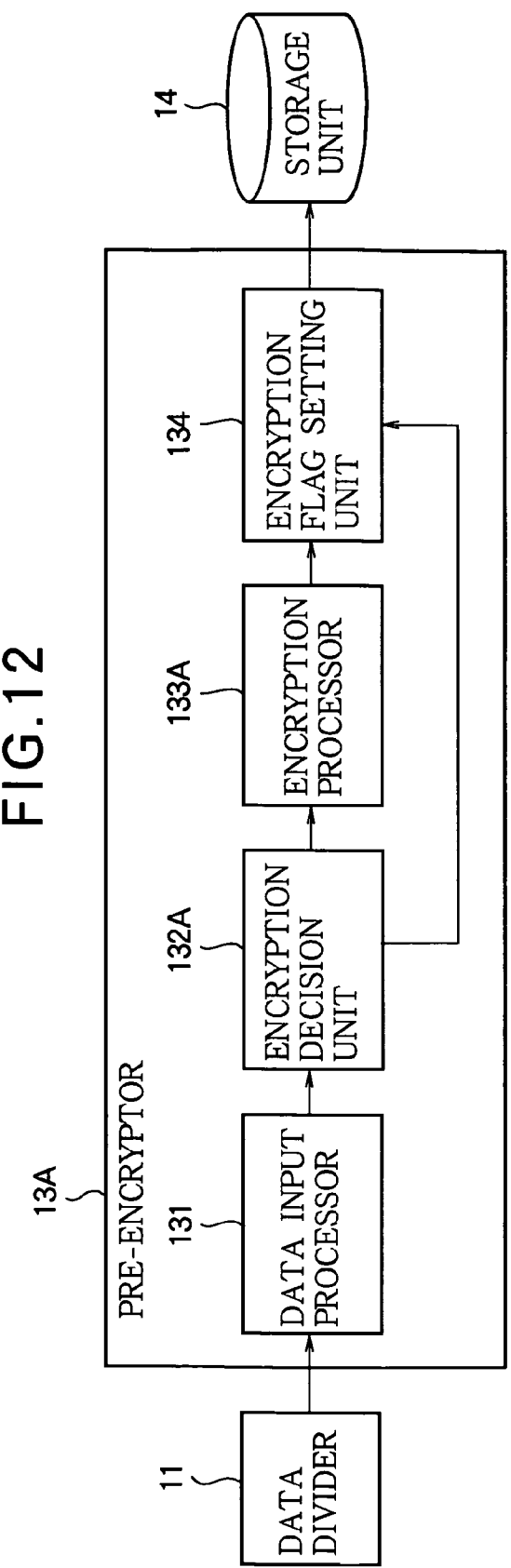
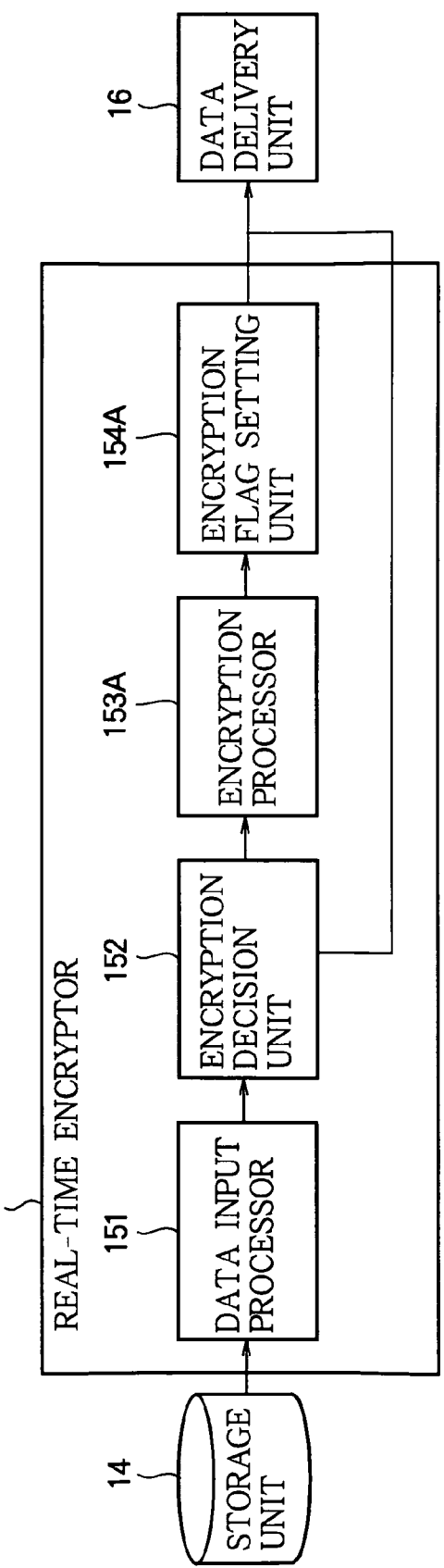

ENCRYPTION DEVICE AND MEDIUM, DECRYPTION DEVICE AND METHOD, DATA DELIVERY DEVICE, DATA RECEIVING DEVICE, AND DATA DELIVERY SYSTEM

BACKGROUND OF THE INVENTION

1. Field of the Invention

The present invention relates generally to the encryption of data for delivery on demand, and more particularly to an encryption device, a decryption device, a data delivery device, a data receiving device, a data delivery system, and media storing encryption and decryption programs applicable to, for example, the distribution of video content.

2. Description of the Related Art

In recent years, services that deliver movies and other video content on demand over the Internet have become popular. Video content is generally protected by copyright or other legal measures, so the content is encrypted to avoid unauthorized redistribution and viewing.

Video content delivered over the Internet may be pre-encrypted as disclosed in Japanese Patent Application Publication No. 2007-13765, or encrypted in real time during delivery.

With pre-encryption, there is no encryption processing load during delivery, but security is weaker than with real-time encryption, because if the encryption code is broken, the content remains vulnerable until the break is discovered and the content is re-encrypted with different encryption conditions. Another problem with pre-encryption is the need to store decryption keys.

Real-time encryption imposes a heavy encryption processing load during delivery, but the encryption keys or other encryption conditions are updated at every delivery, so even if the code is broken, security is not seriously compromised, and key management is easier because the decryption keys do not have to be stored. There is, however, a greater risk of unauthorized viewing or theft of video content by an insider who can gain access to the unencrypted content.

Systems that store the content in pre-encrypted form and then decrypt and re-encrypt the content on delivery have been developed, but these systems have a very high delivery processing load.

There is a need for an encryption device, a decryption device, a data delivery device, a data receiving device, a data delivery system, and media storing encryption and decryption programs that can prevent unauthorized use of data with a reduced delivery processing load.

SUMMARY OF THE INVENTION

The present invention provides an encryption device for use in a data delivery device. The data delivery device divides data representing a single entity into a plurality of data items, encrypts the data items, and delivers the encrypted data items to a data receiving device. The encryption device includes a first encryptor, a storage unit, and a second encryptor.

The first encryptor encrypts a first set of the data items, leaving a second set of the data items unencrypted.

The storage unit stores the encrypted first set of data items and the unencrypted second set of data items, pending delivery to the data receiving device.

The second encryptor encrypts the second set of data items when they are taken from the storage unit and delivered to the data receiving device.

Each data item may include decryption status information indicating whether the data item has been encrypted and if so, by which encryptor.

The first and second encryptors may employ different encryption conditions.

The invention also provides a machine-readable medium storing an encryption program executable by a computing device in a data delivery device that divides data representing a single entity into a plurality of data items, encrypts the data items, and sends the encrypted data items to a data receiving device. The program includes first instructions for encrypting a first set of the data items, leaving a second set of the data items unencrypted; second instructions for storing the encrypted first set of data items and the unencrypted second set of data items in the storage unit in the data delivery device, awaiting delivery to the data receiving device; and third instructions for encrypting the second set of data items when they are taken from the storage unit and delivered to the data receiving device.

The invention also provides a data delivery device including the above the encryption device.

The invention further provides a decryption device for use in a data receiving device that receives a plurality of encrypted data items representing a single entity from a data delivery device and decrypts the encrypted data items. The decryption device decrypts each of the data items by applying decryption conditions according to encryption status information included in each data item.

The invention also provides a machine-readable medium storing a decryption program executable by a computing device in a data receiving device that receives a plurality of encrypted data items representing a single entity from a data delivery device and decrypts the encrypted data items. The program includes instructions for decrypting each of the data items by applying decryption conditions according to encryption status information included in each data item.

The invention also provides a data receiving device that receives a plurality of encrypted data items representing a single entity from a data delivery device and uses the above decryption device to decrypt the received data items.

The invention also provides a data delivery system including a data delivery device that divides data representing a single entity into a plurality of data items, encrypts the data items, and outputs the encrypted data items, and a data receiving device that receives and decrypts the data items, the data delivery device being the data delivery device described above.

By combining pre-encryption and real-time encryption, the encryption device attains a high level of security and prevents unauthorized use of the data, but has only a moderate real-time processing load.

BRIEF DESCRIPTION OF THE DRAWINGS

In the attached drawings:

FIG. 1 is a block diagram illustrating the general configuration of a video content delivery system according to a first embodiment of the invention;

FIG. 2 is a table illustrating the structure of an exemplary packet of video data in the first embodiment;

FIG. 5 is a block diagram illustrating the internal structure of the real-time encryptor in the first embodiment;

FIG. 6 is a block diagram illustrating the internal structure of the decryptor in the first embodiment;

FIG. 11 is a block diagram illustrating the general configuration of a video content delivery system according to a second embodiment;

FIG. 12 is a block diagram illustrating the internal structure of the pre-encryptor in the second embodiment;

FIG. 13 is a block diagram illustrating the internal structure of the real-time encryptor in the second embodiment;

DETAILED DESCRIPTION OF THE INVENTION

Figure 3:
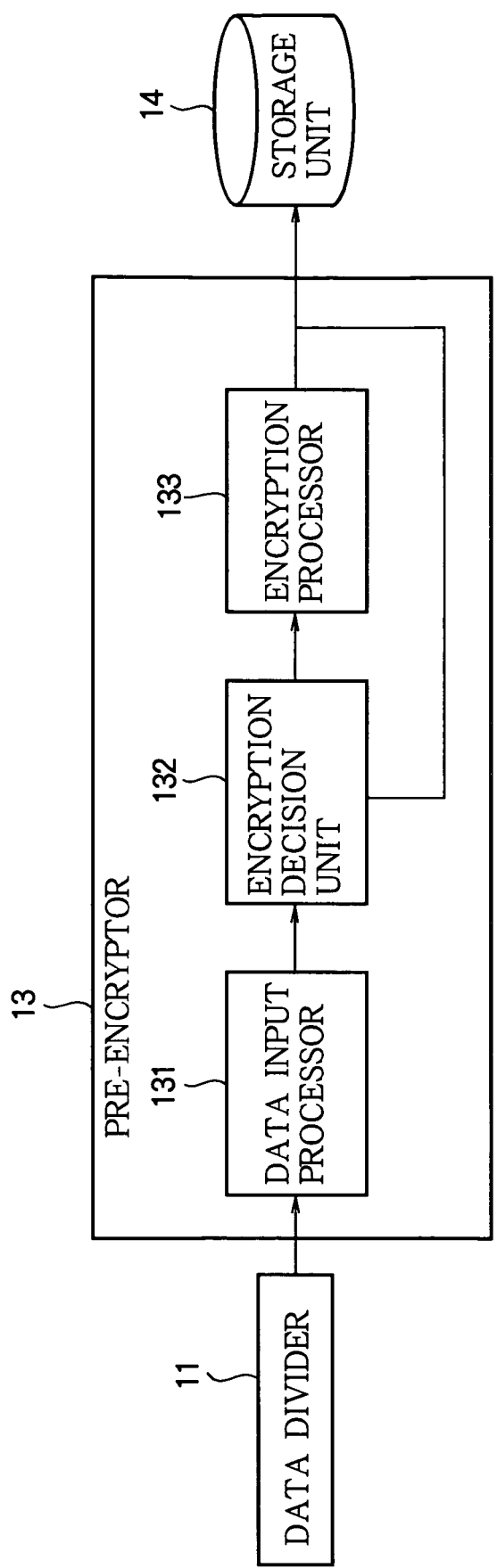
FIG. 3 is a block diagram illustrating the internal structure of the pre-encryptor in the first embodiment.

Embodiments of the invention will now be described with reference to the attached drawings, in which like elements are indicated by like reference characters.

First Embodiment

An encryption device, an encryption program, a decryption device, a decryption program, a data delivery device, a data receiving device, and a data delivery system according to the first embodiment will be described with reference to FIGS. 1 to 10. In this embodiment, the data delivery device, data receiving device, and data delivery system are, respectively, a video content delivery device, a video content receiving device, and a video content delivery system.

Referring to FIG. 1, the video content delivery system 1 includes the video content delivery device 10 and the video content receiving device 20. In the video content delivery system 1, data to be delivered to the video content receiving device 20, such as video content data 30, for example, are encrypted in the video content delivery device 10 before delivery. The video content delivery system 1 may include two or more video content delivery devices 10 and video content receiving devices 20.

The video content delivery device 10 includes a data divider 11, an encryption unit 12, and a data delivery unit 16. The encryption unit 12 includes a pre-encryptor 13, a storage unit 14, and a real-time encryptor 15. The video content delivery device 10 divides the video content data 30 into a plurality of data items, encrypts the plurality of data items, and delivers the encrypted data items to the video content receiving device 20.

FIG. 1 shows the functional structure of the video content delivery device 10. A functional unit such as the pre-encryptor 13 or real-time encryptor 15, for example, includes a computing device with well known components such as a central processing unit (CPU), read-only memory (ROM), random access memory (RAM), electrically erasable programmable read-only memory (EEPROM), hard disk storage unit, communication interfaces, and so on, and an encryption program stored in one of the memory or storage units and executed by the CPU. The functional units shown in FIG. 1 may be implemented on a single computing device or a plurality of computing devices (a distributed processing system).

When provided with video content data 30 representing a single entity such as a movie, the data divider 11 divides the video content data into separate items of data, which it supplies to the encryption unit 12. The data divider 11 may acquire the video content data 30 by any means: for example, the data divider 11 may acquire the video content data 30 from a recording medium or an internal memory (not shown), or may download the video content data 30 from an external device (not shown).

The data items into which the data divider 11 divides the video content data 30 may be packets having a predefined format. In this embodiment, the data divider 11 generates packets in the Transport Stream (TS) format standardized by the Moving Picture Experts Group (MPEG); these packets will be referred to as TS packets. The invention is not limited to the TS format, however; any item or packet format may be used, including variable length formats such as the Program Stream (PS) format.

One TS packet comprises 188 bytes, the functions of which are indicated in FIG. 2.

The encryption unit 12 encrypts the TS packets supplied from the data divider 11 and supplies the encrypted packets to the data delivery unit 16. The encryption unit 12 comprises a pre-encryptor 13, a storage unit 14, and a real-time encryptor 15.

As noted above, the encryption unit 12 may comprise program execution hardware such as a CPU, ROM, RAM, EEPROM, hard disk, and communication interfaces, and an encryption program installed for execution by this hardware. FIG. 1 shows the functional structure of the encryption unit 12.

The encryption unit 12 supplies encrypted packets to the data delivery unit 16 for delivery to the video content receiving device 20. The encryption unit 12 encrypts some of the plurality of TS packets in advance, then encrypts the rest of the TS packets in real time when they are delivered.

The pre-encryptor 13 encrypts the set of the TS packets constituting the part of the video content data 30 that is encrypted in advance, before delivery to the video content receiving device 20, and supplies the partly encrypted video content data 30 to the storage unit 14. Referring to FIG. 3, the pre-encryptor 13 includes a data input processor 131, an encryption decision unit 132, and an encryption processor 133.

The data input processor 131 accepts the TS packets from the data divider 11 and supplies them to the encryption decision unit 132.

The encryption decision unit 132 receives the TS packets from the data input processor 131 and determines whether or not they are to be encrypted in advance. The encryption decision unit 132 supplies the TS packets that are to be encrypted in advance to the encryption processor 133, and supplies the TS packets that are not to be encrypted in advance to the storage unit 14.

The encryption decision unit 132 determines whether or not the TS packets are to be encrypted in advance according to a predefined criterion. For example, TS packets having predefined header information may be encrypted, or TS packets at predefined positions, one in every two TS packets, for example, may be encrypted, or TS packets having a predefined frame type may be encrypted. Any criterion may be used. In this embodiment, the encryption decision unit 132 decides whether or not to encrypt TS packets in advance according to their header information.

As shown in FIG. 2, the header of a TS packet includes a two-bit Transport_scrambling_control code, the usage of which can be defined by the user. As an example of such user-defined usage, the Transport_scrambling_control code is used in this embodiment as an encryption flag indicating the encryption status of the TS packet. The encryption decision unit 132 in this embodiment tests this encryption flag to determine whether or not each TS packet is to be encrypted in advance. Specifically, TS packets having an encryption flag value of '01' are to be encrypted.

Since advance encryption of TS packets is determined from their encryption flags, the data divider 11 sets the encryption flag values when generating the TS packets. The data divider 11 may use any method to assign encryption flag values. For example, the data divider 11 may use a separate random number generator to assign random values to the encryption flags. Alternatively, the data divider 11 may assign encryption flag values to the TS packets in a predefined cyclic sequence such as '00', '01', '10', '11', '00', '01', '10' . . . , or may assign the value '01' to TS packets in predefined sequential positions.

The encryption processor 133 encrypts the TS packets supplied by the encryption decision unit 132 and supplies the encrypted packets to the storage unit 14. The encryption processor 133 may encrypt only the payload data (Data_byte in FIG. 2) in the TS packets. The encryption scheme employed in the encryption processor 133 may also be independent of preceding encryption results.

Figure 4:
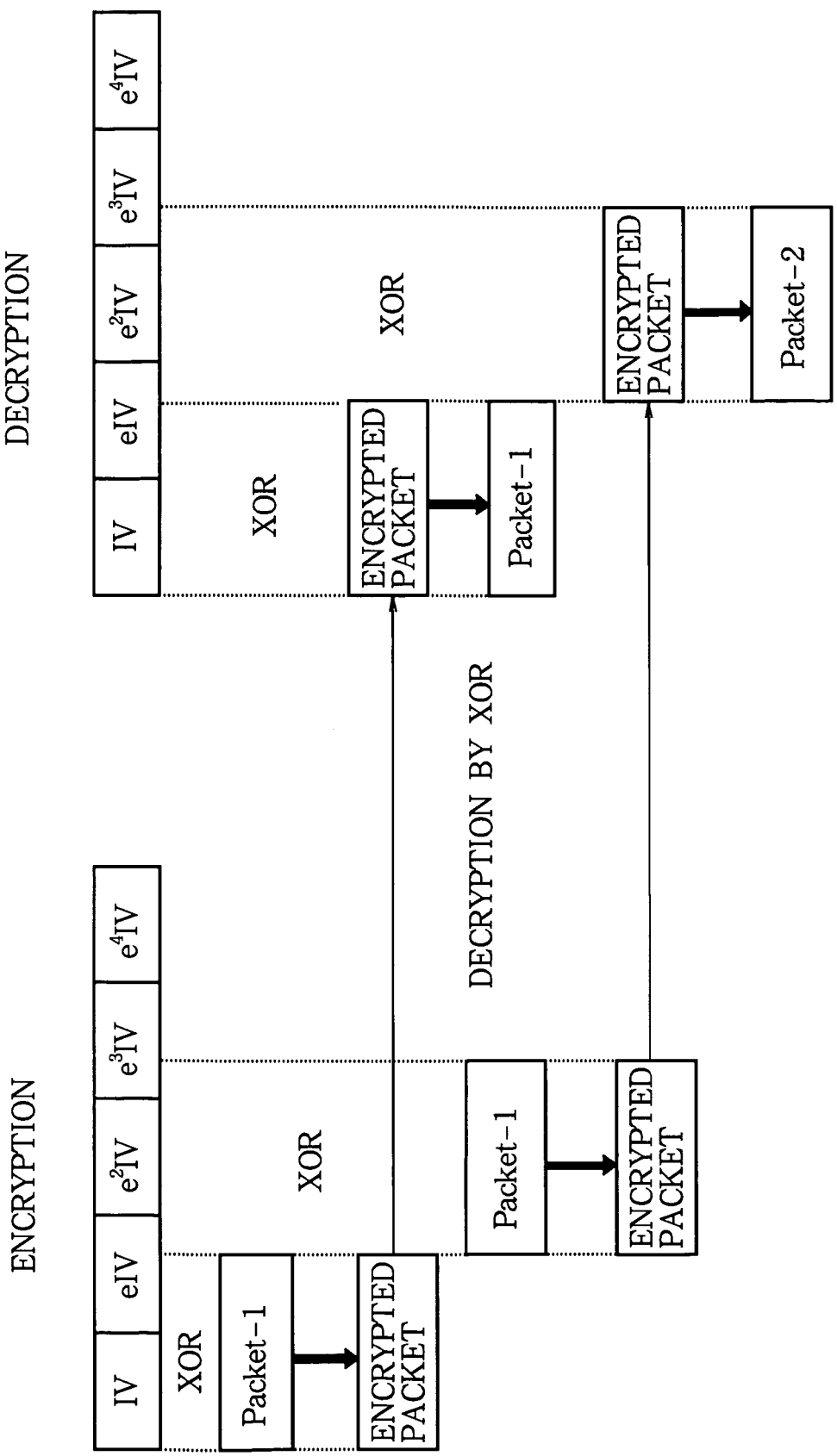
FIG. 4 illustrates an exemplary encryption system in the first embodiment.

FIG. 4 illustrates an exemplary encryption system in the first embodiment in which each TS packet is encrypted without reference to the result of encryption of the preceding packet. The well-known Advanced Encryption Standard (AES) may be used.

The storage unit 14 stores the encrypted and unencrypted TS packets supplied from the pre-encryptor 13 and supplies them to the real-time encryptor 15 for delivery to the video content receiving device 20. The storage unit 14 may store encryption and decryption keys together with the TS packets. The storage unit 14 may be external to the encryption unit 12, and the encryption unit 12 may read data from the storage unit 14 each time the data are to be delivered. The encryption unit 12, pre-encryptor 13, storage unit 14, and real-time encryptor 15 may be arranged in any manner provided that the storage unit 14 can store both TS packets that have been encrypted by the pre-encryptor 13 and TS packets that have not been encrypted by the pre-encryptor 13.

The real-time encryptor 15 encrypts some or all of the unencrypted TS packets obtained from the storage unit 14, and supplies these encrypted packets, the packets encrypted by the pre-encryptor 13, and the packets (if any) that are left unencrypted to the data delivery unit 16. Referring to FIG. 5, the real-time encryptor 15 includes a data input processor 151, an encryption decision unit 152, an encryption processor 153, and an encryption flag setting unit 154.

The data input processor 151 reads TS packets from the storage unit 14 and supplies them to the encryption decision unit 152.

The encryption decision unit 152 receives TS packets from the data input processor 151 and determines whether or not the TS packets are to be encrypted. The encryption decision unit 152 supplies TS packets to be encrypted to the encryption processor 153 and TS packets that need not be encrypted to the data delivery unit 16.

The encryption decision unit 152 may determine whether or not TS packets are to be encrypted according to the encryption flags in the packets. In this example, packets having encryption flag values of '01' have already been encrypted by the pre-encryptor 13, as described above.

The encryption processor 153 encrypts the TS packets supplied from the encryption decision unit 152 and supplies the encrypted packets to the encryption flag setting unit 154. The encryption conditions, including the encryption method and encryption keys used in the encryption processor 153 are similar to those used in the encryption processor 133.

The encryption flag setting unit 154 adds encryption flag information indicating that the TS packets have been encrypted to the header information in the TS packets supplied by the encryption processor 153, and supplies them to the data delivery unit 16.

The encryption flag value set by the encryption flag setting unit 154 may differ from the encryption flag value that designates pre-encrypted packets. For example, the encryption flag setting unit 154 may set an encryption flag value of '10', as will be assumed below. Alternatively, the encryption flag setting unit 154 may set the same encryption flag value ('01') as assigned to pre-encrypted packets.

The data delivery unit 16 delivers the TS packets supplied from the real-time encryptor 15 to the video content receiving device 20.

The video content receiving device 20 receives encrypted TS packets from the video content delivery device 10, decrypts them, and outputs the decrypted packets. The video content receiving device 20 comprises a decryptor 21 and an output unit 22.

The decryptor 21 decrypts the encrypted TS packets received from the video content delivery device 10. Referring to FIG. 6, the decryptor 21 includes a data receiving unit 211, an encryption decision unit 212, and a decryption processor 213.

Like the encryption unit 12, the decryptor 21 comprises program execution hardware such as a CPU, ROM, RAM, EEPROM, hard disk, and communication interfaces, and a decryption program installed for execution by this hardware. FIG. 6 illustrates the functional structure of the decryptor 21. The functional units shown in FIG. 6 may be implemented on a single computing device or a plurality of computing devices (a distributed processing system).

The data receiving unit 211 reads the TS packets supplied from the video content delivery device 10 to the video content receiving device 20, and supplies them to the encryption decision unit 212.

The encryption decision unit 212 determines whether or not the TS packets supplied from the data receiving unit 211 are encrypted, supplies the encrypted TS packets to the decryption processor 213, and supplies the TS packets that are not encrypted to the output unit 22.

The encryption decision unit 212 may determine whether or not TS packets are encrypted according to their encryption flag values. If TS packets encrypted by the pre-encryptor 13 have an encryption flag value of '01' and those encrypted by the real-time encryptor 15 have an encryption flag value of '10' as described above, the encryption decision unit 212 decides that a TS packet having an encryption flag of '01' or '10' is encrypted. If TS packets encrypted by the pre-encryptor 13 and those encrypted by the real-time encryptor 15 both have the same encryption flag value ('01', for example), the encryption decision unit 212 identifies encrypted packets from this single encryption flag value ('01').

The decryption processor 213 decrypts the TS packets supplied from the encryption decision unit 212 and supplies them to the output unit 22. The decryption processor 213 may have prestored information necessary for decryption, such as a decryption key. Alternatively, it may receive such information from the video content delivery device 10 or another external authorization device (not shown in FIG. 1) and store the information. The decryption processor 213 may acquire the necessary information by any methods.

The output unit 22 outputs the TS packets supplied from the decryptor 21. The output unit 22 may perform image processing and output the TS packets by displaying them as images on a display device, or it may output the TS packets for storage in a memory device such as a disk device internal to or external to the system. Any form of output may be used.

Next the operation of the first embodiment will be described with reference to the flowchart in FIG. 7.

First, when video content data 30 are supplied to the video content delivery device 10, the data divider 11 divides the data into TS packets, and passes the TS packets to the encryption unit 12 (step S110).

The encryption unit 12 receives the TS packets, and its pre-encryptor 13 encrypts some of the TS packets (step S120).

The pre-encryptor 13 stores both the encrypted and unencrypted TS packets in the storage unit 14 (step S130).

At data delivery, the TS packets stored in the storage unit 14 are supplied to the real-time encryptor 15, which encrypts some or all of the TS packets that were not encrypted in step S120, and supplies all of the TS packets, whether encrypted by the pre-encryptor 13, the real-time encryptor 15, or neither encryptor, to the data delivery unit 16 (step S140).

The data delivery unit 16 sends the TS packets supplied from the real-time encryptor 15 to the video content receiving device 20 (step S150).

The video content receiving device 20 receives the TS packets from the video content delivery device 10. The decryptor 21 in the video content receiving device 20 decrypts the TS packets (step S160).

Next, the operation of the pre-encryptor 13 in step S120 will be described in more detail.

Figure 8:
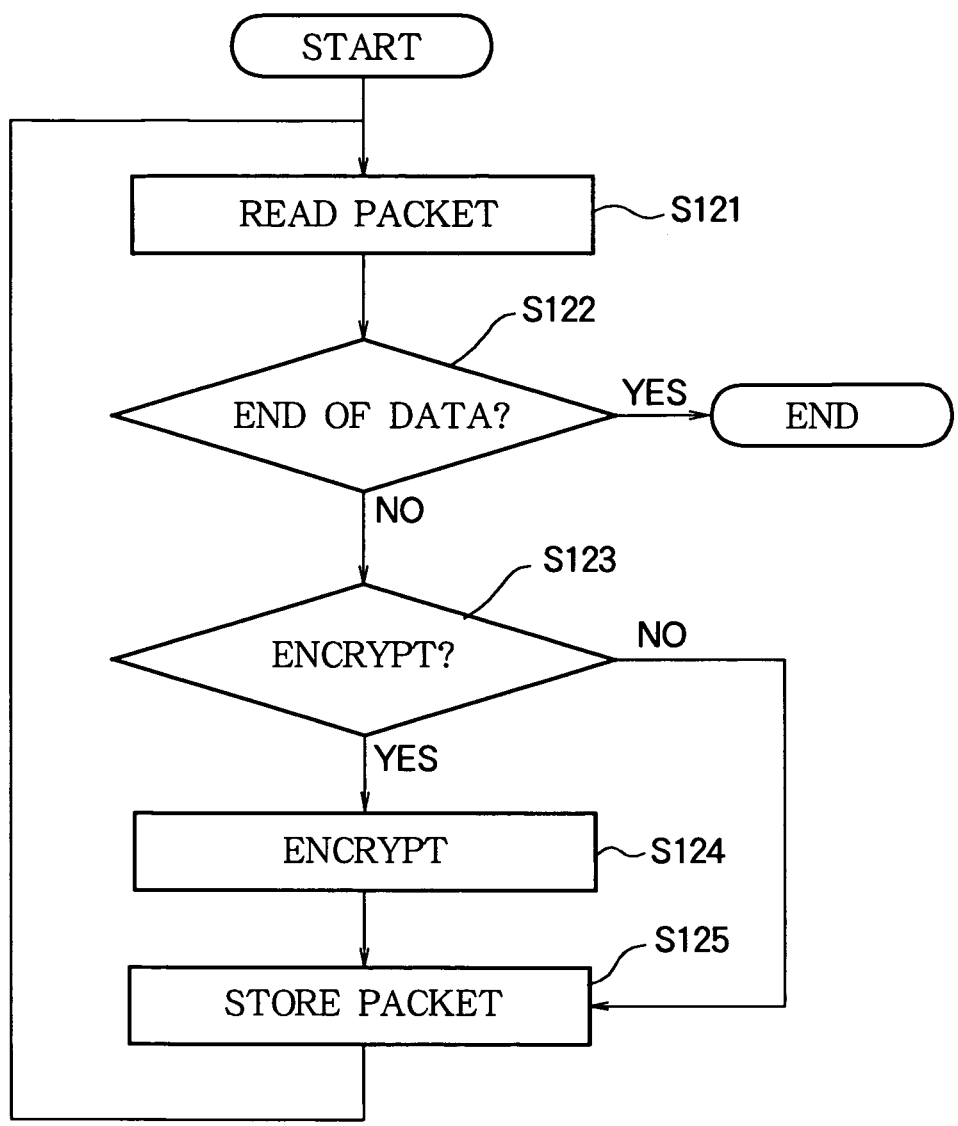
FIG. 8 is a flowchart illustrating in detail the operation of the pre-encryptor in the first embodiment.

Referring to the flowchart in FIG. 8, TS packets are supplied from the data divider 11 to the pre-encryptor 13, read by the data input processor 131, and supplied to the encryption decision unit 132. When all the TS packets have been read, the process ends (steps S121, S122).

The encryption decision unit 132 determines whether or not the TS packets are to be encrypted according to a predefined criterion. The packets to be encrypted are supplied to the encryption processor 133, while those not to be encrypted are supplied to the storage unit 14 (steps S123, S125). In step S123, the encryption decision unit 132 determines that TS packets are to be encrypted when their encryption flag value is '01'.

The TS packets are supplied from the encryption decision unit 132 to the encryption processor 133, encrypted by the encryption processor 133, and supplied to the storage unit 14 (steps S124, S125).

The operation of the real-time encryptor 15 in step S140 will now be described in more detail.

Figure 9:
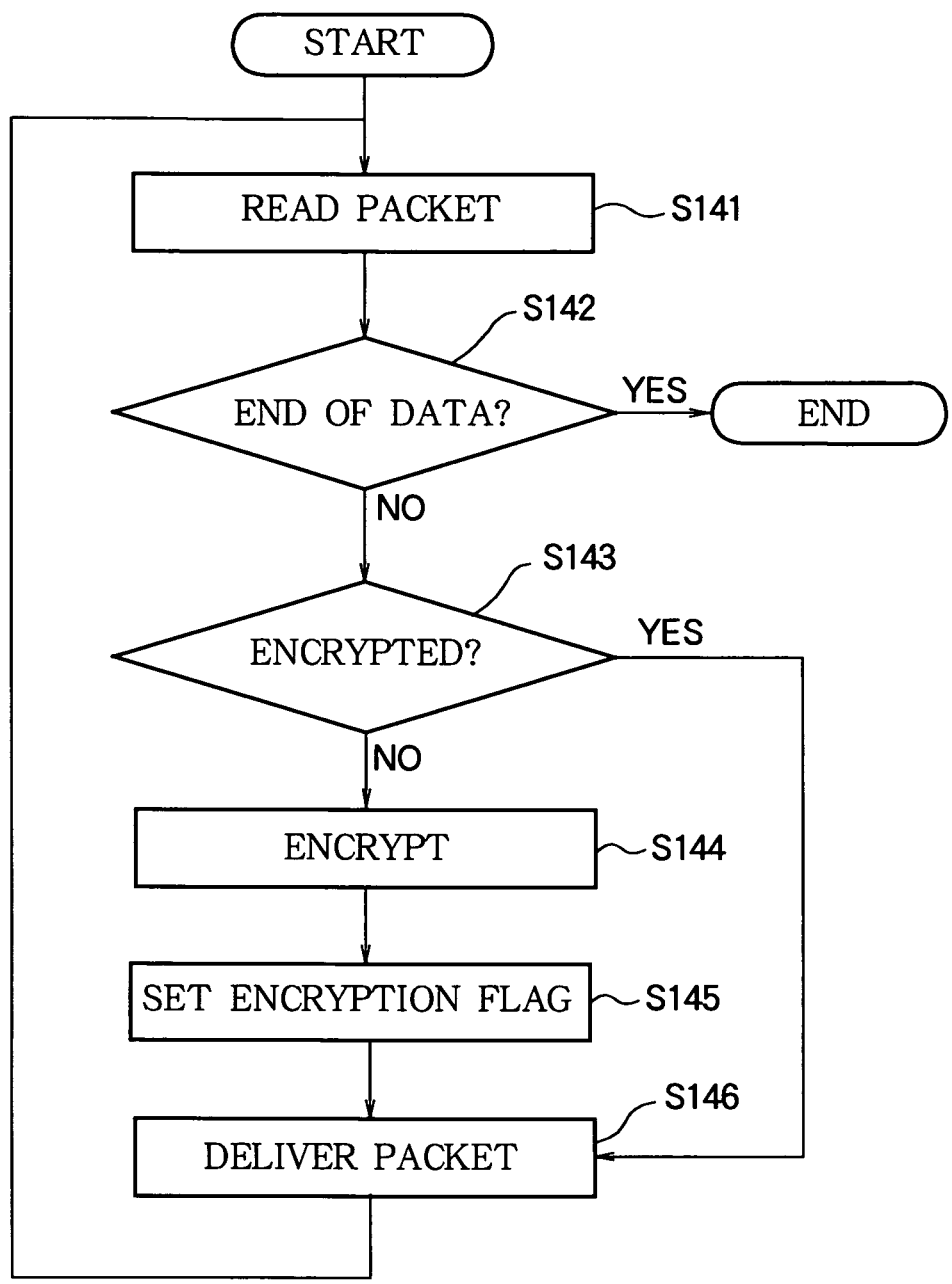
FIG. 9 is a flowchart illustrating in detail the operation of the real-time encryptor in the first embodiment.

Referring to the flowchart in FIG. 9, the TS packets are supplied from the storage unit 14 to the real-time encryptor 15, read by the data input processor 151, and supplied to the encryption decision unit 152. When all the TS packets have been read, the process ends (steps S141, S142).

From the encryption flags, the encryption decision unit 152 determines whether or not the TS packets are encrypted. Unencrypted TS packets are supplied to the encryption processor 153, and encrypted TS packets are supplied to the data delivery unit 16 (step S143).

The TS packets supplied from the encryption decision unit 152 to the encryption processor 153 are encrypted by the encryption processor 153 and supplied to the encryption flag setting unit 154 (step S144).

The TS packets supplied from the encryption processor 153 to the encryption flag setting unit 154 are given an encryption flag value of '10' and supplied to the data delivery unit 16 (steps S145, S146).

Figure 10:
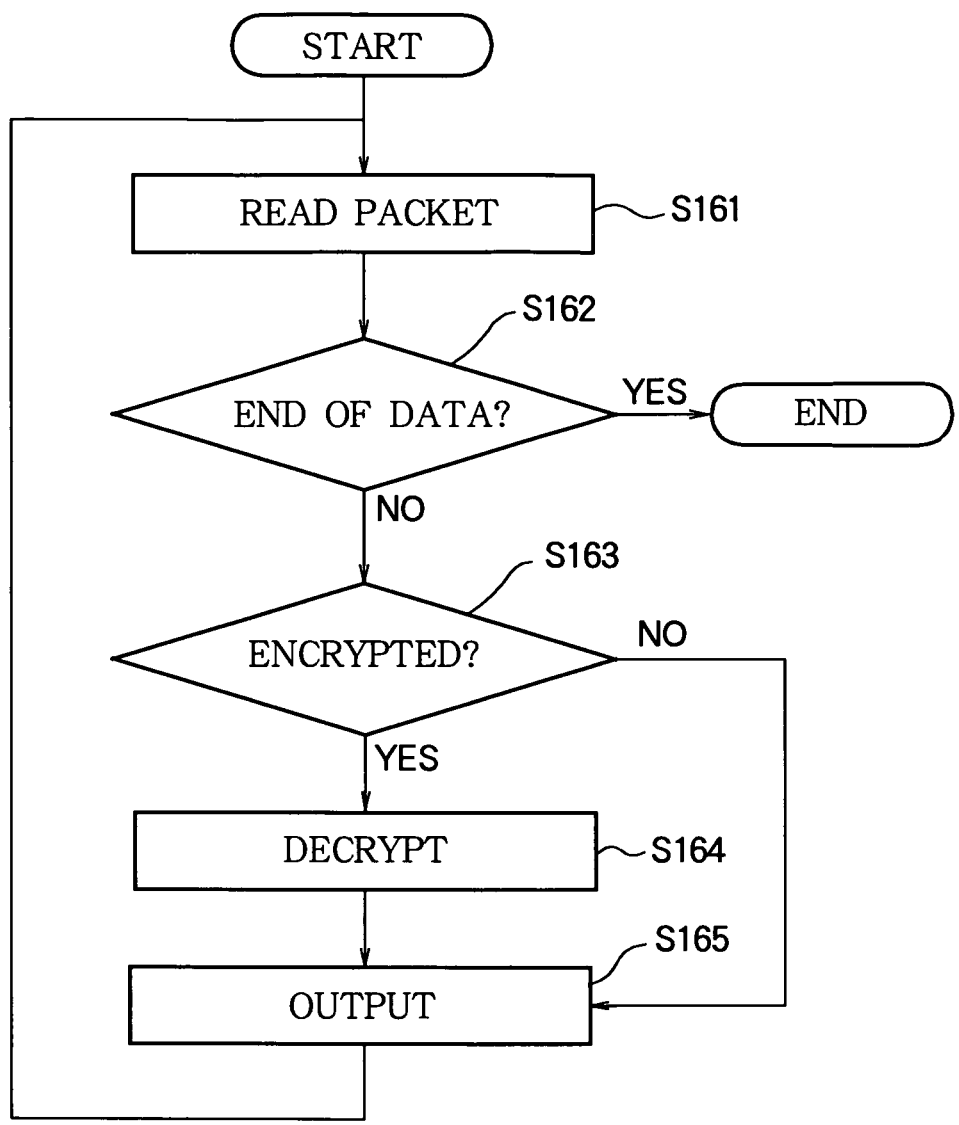
FIG. 10 is a flowchart illustrating in detail the operation of the decryptor in the first embodiment.

The detailed operation of the decryptor 21 in step S160 will be described with reference to the flowchart in FIG. 10.

TS packets are supplied from the video content delivery device 10 to the decryptor 21, received by the data receiving unit 211, and supplied to the encryption decision unit 212. When all the TS packets have been received, the process ends (steps S161, S162).

The encryption decision unit 212 determines whether or not the TS packets are encrypted, based on their encryption flags. The TS packets that are encrypted are supplied to the decryption processor 213; those that are not encrypted are supplied to the output unit for output (steps S163, S165). In step S163, TS packets having an encryption flag value of '01' or '10' are determined to be encrypted.

The TS packets supplied from the encryption decision unit 212 to the decryption processor 213 are decrypted by the decryption processor 213 and supplied to the output unit 22 for output (steps S164, S165).

The first embodiment has the following effects.

In the encryption unit 12, since the pre-encryptor 13 has already encrypted some of the TS packets generated from the video content data 30, when the data are delivered, only the remaining packets have to be encrypted in real time. Since the real-time encryptor 15 does not have to encrypt all of the TS packets, the real-time processing load is reduced.

Since some of the TS packets of the video content data 30 stored in the storage unit 14 are encrypted, video content acquired from the storage unit 14 by unauthorized access cannot be replayed (viewed).

Second Embodiment

An encryption device, an encryption program, a decryption device, a decryption program, a data delivery device, a data receiving device, and a data delivery system according to the second embodiment will be described with reference to FIGS. 11 to 18. In this embodiment, the data delivery device, data receiving device, and data delivery system are, respectively, a video content delivery device, a video content receiving device, and a video content delivering system.

Referring to FIG. 11, the video content delivering system 1A includes a video content delivery device 10A, a video content receiving device 20A, and a video content data 30. The video content delivery device 10A includes a data divider 11, an encryption unit 12A, and a data delivery unit 16. The video content receiving device 20A includes a decryptor 21A and an output unit 22. The encryption unit 12A has a pre-encryptor 13A, a storage unit 14, and a real-time encryptor 15A. The data divider 11, the storage unit 14, and the data delivery unit 16 are the same as in the first embodiment, so descriptions will be omitted.

In the first embodiment, the same encryption conditions (the same encryption key data and the same encryption methods, for example) were used in both the pre-encryptor 13 and real-time encryptor 15. The video content delivery device 10A in the second embodiment uses different encryption conditions in the pre-encryptor 13A and the real-time encryptor 15A. The following description will focus on this difference.

Referring to FIG. 12, the pre-encryptor 13A comprises a data input processor 131, an encryption decision unit 132A, an encryption processor 133A, and an encryption flag setting unit 134. The data input processor 131 is the same as in the first embodiment, so a description will be omitted.

The encryption decision unit 132A is similar to the encryption decision unit 132 in the first embodiment. In this embodiment, the encryption decision unit 132A selects TS packets at predefined positions, such as one in every two packets, for encryption and sends them to the encryption processor 133A, but this is not a limitation. Like the encryption decision unit 132 in the first embodiment, the encryption decision unit 132A may select TS packets to be encrypted according header information or any other suitable criterion.

The encryption processor 133A is substantially identical to the encryption processor 133 of the first embodiment, except that the encryption conditions used in the encryption processor 133A differ from the encryption conditions used in the encryption processor 153A (described later) in the real-time encryptor 15A. For example, the encryption processor 133A and the encryption processor 153A may use different encryption keys and/or encryption methods.

The encryption flag setting unit 134 receives TS packets from the pre-encryptor 13A, sets information (an encryption flag) in their headers indicating that the packets have been encrypted in the pre-encryptor 13, and supplies the packets to the storage unit 14. The encryption flag value set by the encryption flag setting unit 134 differs from the encryption flag value set by the encryption flag setting unit 154 (described later) in the real-time encryptor 15. In the second embodiment, the data divider 11 sets a default encryption flag value of '00' in the TS packets it generates, encryption flag setting unit 134 sets an encryption flag value of '01' in TS packets encrypted in the pre-encryptor 13A, and encryption flag setting unit 154A sets an encryption flag value of '10' in TS packets encrypted in the real-time encryptor 15A. The video content receiving device 20A can thereby tell whether received TS packets have been encrypted under the encryption conditions of the pre-encryptor 13A or the real-time encryptor 15A.

Referring to FIG. 13, the real-time encryptor 15A includes a data input processor 151, an encryption decision unit 152, an encryption processor 153A, and an encryption flag setting unit 154A. The data input processor 151 and the encryption decision unit 152 are the same as in the first embodiment, so descriptions will be omitted.

The encryption processor 153A is substantially identical to the encryption processor 153 in the first embodiment, except that the TS packet encryption conditions used in the encryption processor 153A differ from the encryption conditions used by the encryption processor 133A in the pre-encryptor 13A.

The encryption flag setting unit 154A is substantially identical to the encryption flag setting unit 154 in the first embodiment, except that it must set a different encryption flag value from the value set by the encryption flag setting unit 134 in the pre-encryptor 13A.

The video content receiving device 20A comprises a decryptor 21A and an output unit 22.

The output unit 22 is the same as in the first embodiment, so a description will be omitted.

Figure 14:
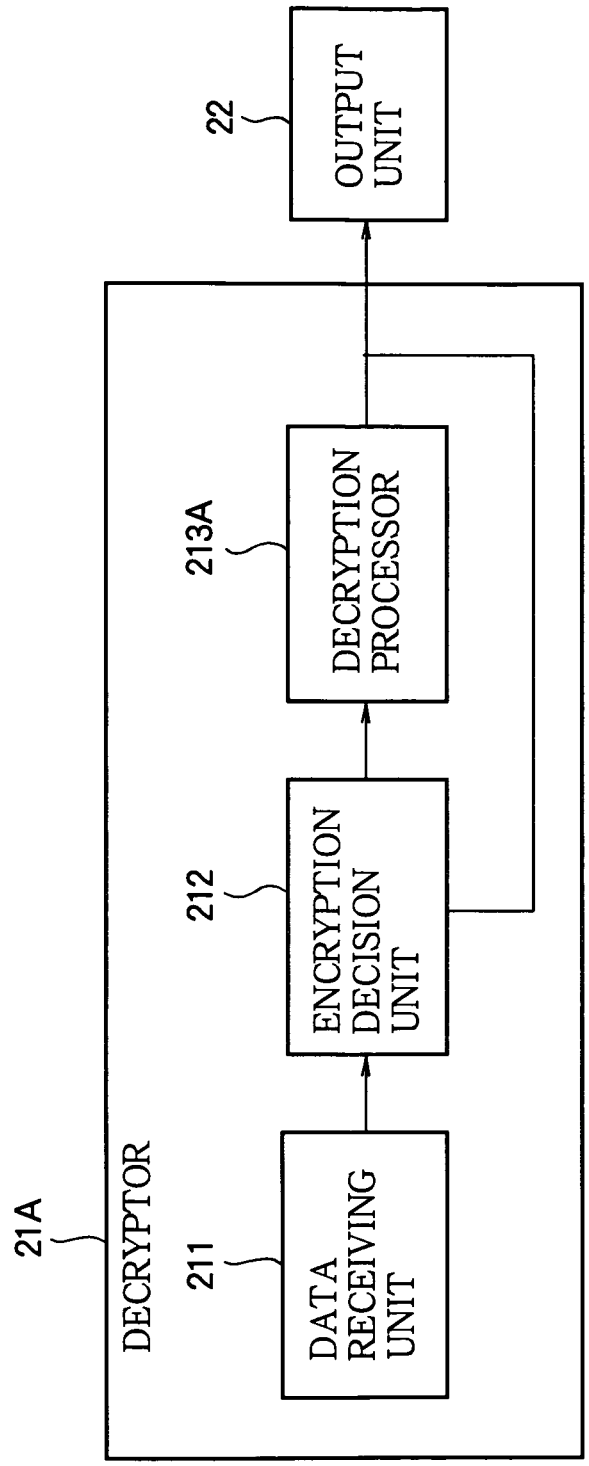
FIG. 14 is a block diagram illustrating the internal structure of the decryptor in the second embodiment.

Referring to FIG. 14, the decryptor 21A comprises a data receiving unit 211, a encryption decision unit 212, and a decryption processor 213A. The data receiving unit 211 and the encryption decision unit 212 are the same as in the first embodiment, so descriptions will be omitted.

The decryption processor 213A is substantially identical to the decryption processor 213 in the first embodiment except that the decryption processor 213A selects decryption conditions that may differ from packet to packet. The decryption conditions correspond to the encryption conditions used by the encryption processor indicated by the encryption flag in each TS packet. Other functions of the decryption processor 213 are as described in the first embodiment.

The encrypted TS packets have encryption flag values of '01' or '10'. The decryption processor 213A stores the encryption keys and other information necessary for decrypting TS packets encrypted under the encryption conditions corresponding to both encryption flag values. The decryption processor 213A may have this information prestored in advance, or it may acquire and store the information from the video content delivery device 10A or another external authorization device (not shown) at every data reception. Any method may be used to acquire the information necessary for decryption.

Next, the operation of the video content delivering system 1A in the second embodiment will be described.

As explained above, the video content delivery device 10A in the second embodiment differs from the first embodiment in that the pre-encryptor 13A and real-time encryptor 15A use different encryption conditions to encrypt the TS packets, and the decryption processor 213A uses correspondingly different decryption conditions to decrypt the TS packets.

Figure 15:
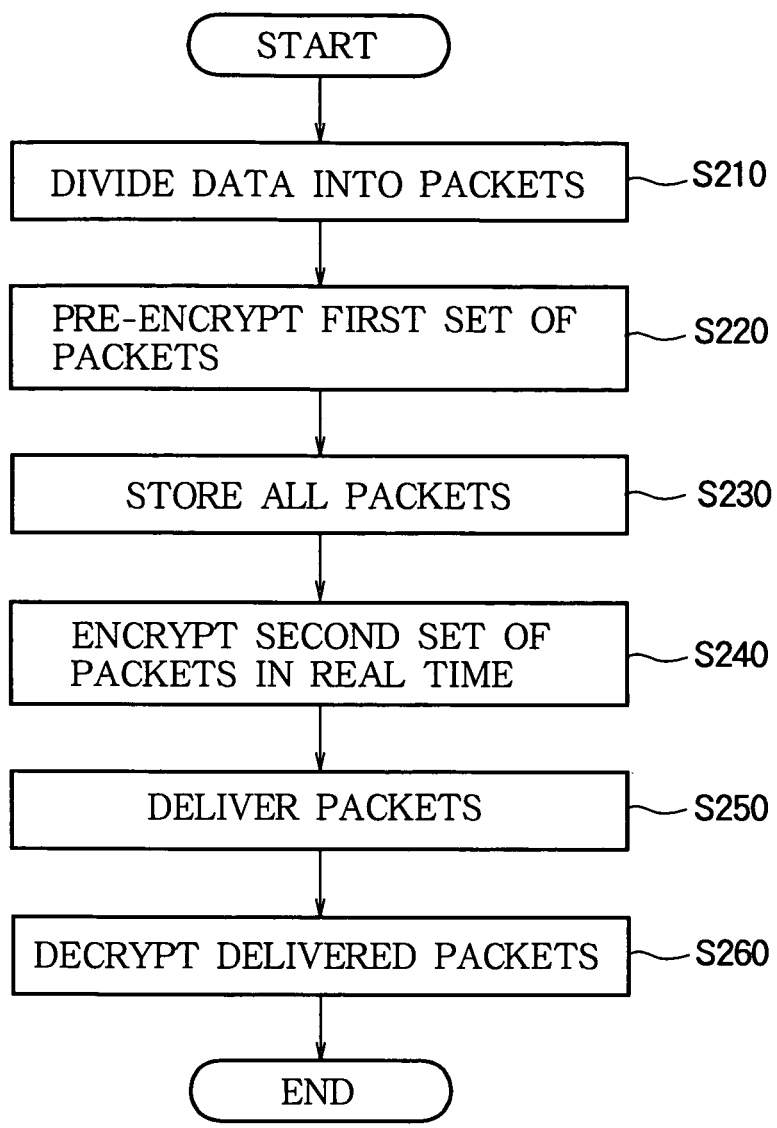
FIG. 15 is a flowchart illustrating the overall data delivery operation in the video content delivery system in the second embodiment.

FIG. 15 is a flowchart illustrating the overall data delivery operation in the video content delivering system 1A, in which video content data 30 are delivered from the video content delivery device 10A to the video content receiving device 20A. Steps S210, S230, and S250 are similar to steps S110, S130, and S150 in the first embodiment (FIG. 7), so descriptions will be omitted.

Figure 7:
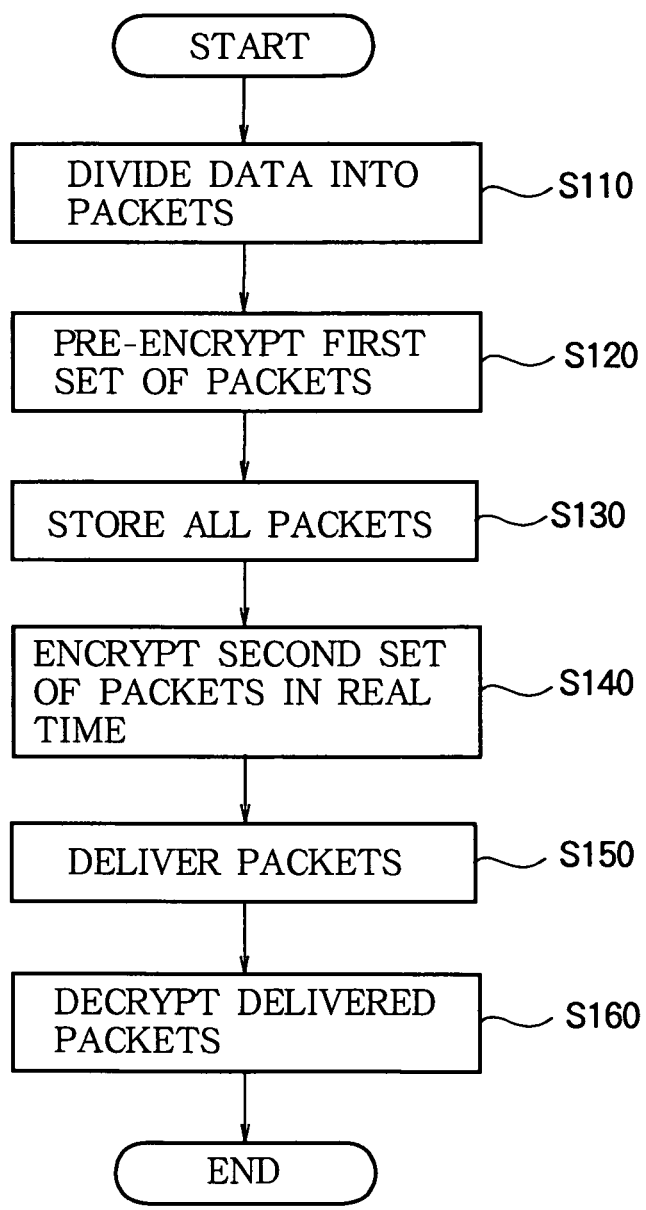
FIG. 7 is a flowchart illustrating the overall data delivery operation in the video content delivery system in the first embodiment.

Except for using different encryption conditions, steps S220 and S240 are substantially identical to steps S120 and S140 in FIG. 7, so detailed descriptions will be omitted.

Step S260 is substantially identical to step S150 (FIG. 7) except that in step S260 the decryptor 21A receives the TS packets, selects the decryption conditions to be applied to the TS packets, based on their encryption flags, and decrypts the TS packets accordingly. A detailed description of step S260 will be omitted.

Figure 16:
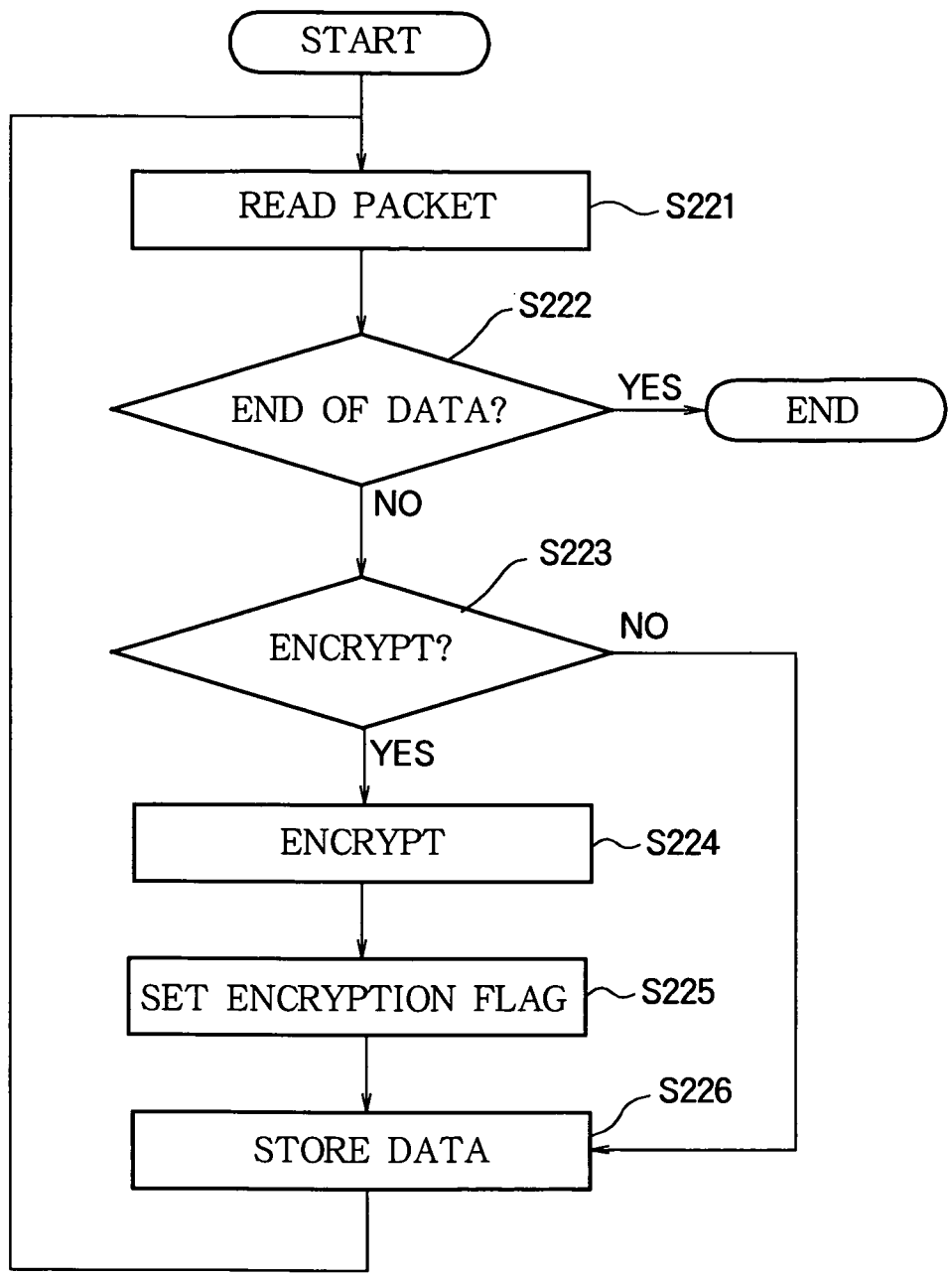
FIG. 16 is a flowchart illustrating in detail the operation of the pre-encryptor in the second embodiment.

Next, the operation of the pre-encryptor 13A in step S220 will be described with reference to the flowchart in FIG. 16.

The operations in steps S221 to S223 are similar to the operations in steps S121 to S123 in the first embodiment (FIG. 8), so descriptions will be omitted.

The TS packets are supplied from the encryption decision unit 132A to the encryption processor 133A, encrypted under encryption conditions different from the encryption conditions used by the encryption processor 153A in the real-time encryptor 15A, and then supplied to the encryption flag setting unit 134 (step S224).

The TS packets supplied from the encryption processor 133A to the encryption flag setting unit 134 are given encryption flag values of '01', and are supplied to the storage unit 14 (steps S225, S226).

Figure 17:
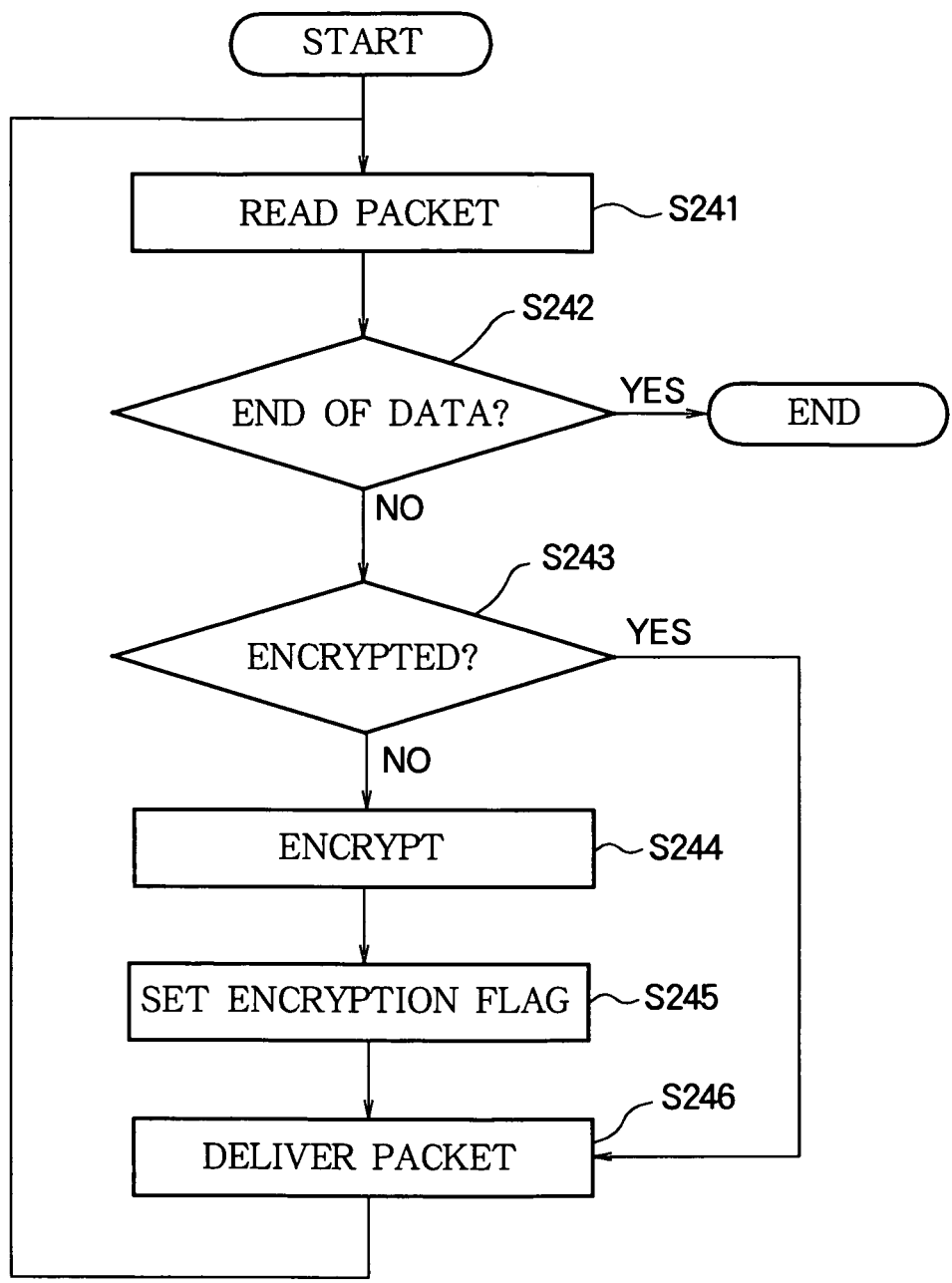
FIG. 17 is a flowchart illustrating in detail the operation of the real-time encryptor in the second embodiment.

Next, the operation of the real-time encryptor 15A in the step S240 will be described in more detail with reference to the flowchart illustrating in FIG. 17.

The operations in steps S241 to S243 are similar to the operations in steps S141 to S143, so descriptions will be omitted.

The TS packets supplied from the encryption decision unit 152 to the encryption processor 153A are encrypted by the encryption processor 153A under encryption conditions different from those used by the encryption processor 133A in the pre-encryptor 13A, and are supplied to the encryption flag setting unit 154A (step S244).

The TS packets supplied from the encryption processor 153A to the encryption flag setting unit 154A are given an encryption flag value of '10', and are supplied to the data delivery unit 16 for distribution (steps S245, S246).

Figure 18:
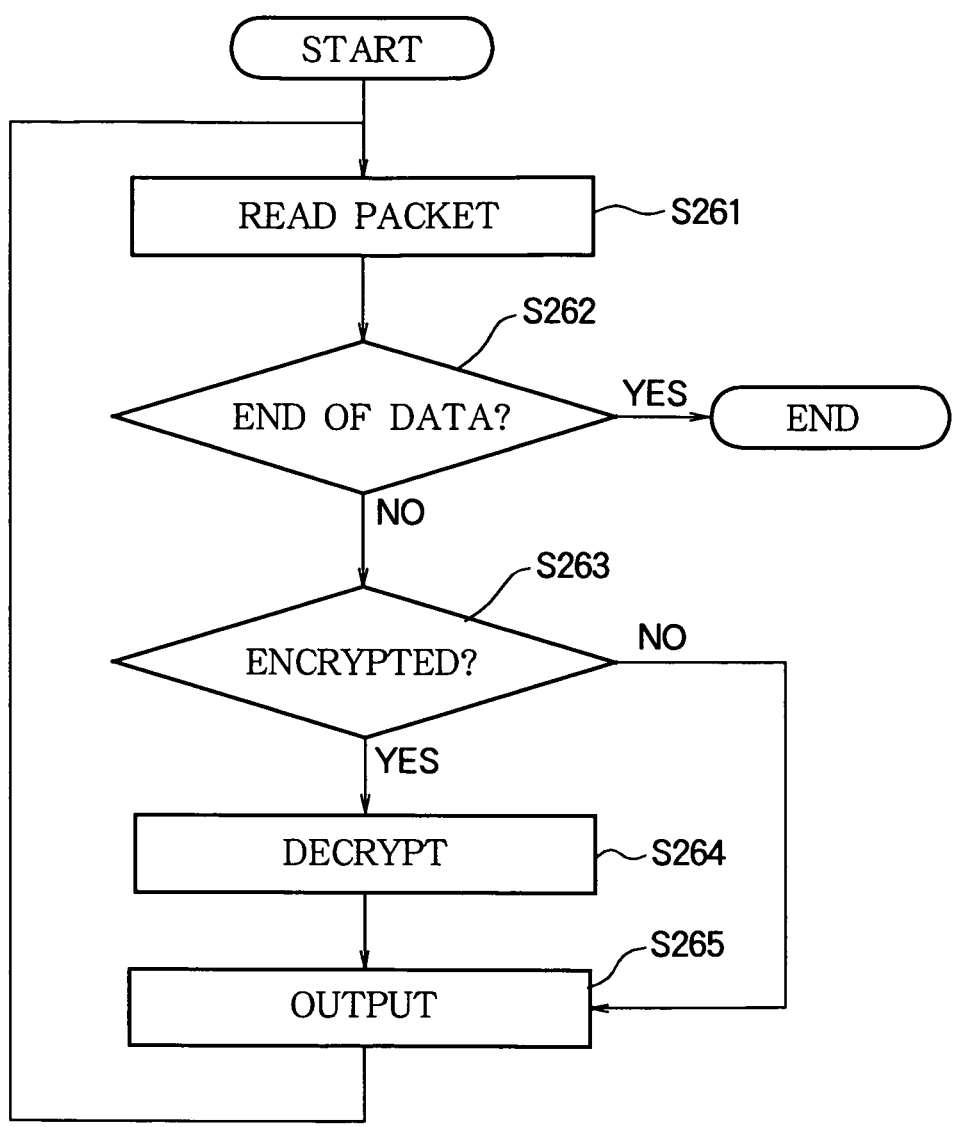
FIG. 18 is a flowchart illustrating in detail the operation of the decryptor in the second embodiment.

The operation of the decryptor 21A in the step S260 will now be described with reference to the flowchart in FIG. 18.

The operations in steps S261 to S263 are similar to the operations in steps S161 to S163 in the first embodiment (FIG. 10), so descriptions will be omitted.

TS packets are supplied from the encryption decision unit 212 to the decryption processor 213A, decrypted under decryption conditions corresponding to their encryption flags, and supplied to the output unit 22 (steps S264, S265).

The second embodiment has the following effects in addition to effects obtained in the first embodiment.

Since the pre-encryptor 13A and the real-time encryptor 15A use different encryption keys or other differing encryption conditions, the second embodiment provides improved security compared to the first embodiment. For example, even if the decryption key used by the pre-encryptor 13A is stolen, the TS packets encrypted by the real-time encryptor 15A cannot be decrypted. Thus, the second embodiment provides improved protection from unauthorized replay (viewing) of the video content data 30.

Variations

Some variations of the preceding embodiments will now be described.

In one variation of either of the above embodiments, the encryption decision unit that checks the encryption flags in the decryption device is omitted. In this variation, all delivered TS packets are encrypted and all received TS packets are decrypted.

In a variation of the first embodiment, an encryption flag setting unit 134 is inserted after the encryption processor 133 in the pre-encryptor 13, as in the pre-encryptor 13A in the second embodiment, to set an encryption flag for each TS packet encrypted by the encryption processor 133 in the pre-encryptor 13.

In this variation, when a TS packet is generated in the data divider 11, its encryption flag is initialized to '00' as in the second embodiment, and different encryption flag values ('01' and '10', for example) are set by the pre-encryptor 13 and real-time encryptor 15. In this case, the video content receiving device 20 recognizes that a TS packet is encrypted when its encryption flag is '10' or '10'.

Alternatively, in the first embodiment, an encryption flag setting unit may be provided in the pre-encryptor 13 and not in the real-time encryptor 15. In this configuration, the TS packets generated in the data divider 11 have a default encryption flag value of '00' and those encrypted by the pre-encryptor 13 receive an encryption flag value of '01'. The real-time encryptor 15 uses the encryption flag to distinguish encrypted packets from unencrypted packets, and encrypts all unencrypted packets. Since all packets received by the decryptor 21 have been encrypted, the encryption decision unit 212 does not have to decide whether or not the received TS packets are encrypted, and passes all received packets to the decryption processor 213. Since all TS packets are encrypted under the same encryption conditions, the decryption processor 213 can decrypt them correctly.

In a similar variation of the second embodiment, the encryption flag setting unit 154A is omitted from the real-time encryptor 15A, and the decryption processor 213A assumes that TS packets with the default encryption flag value ('00') have been encrypted by the real-time encryptor 15A.

The data delivered from the video content delivery device 10 to the video content receiving device 20 not be limited to video content. The invention can be applied to the delivery of any type of data, including image data, voice data, game software, and book data. When the data to be delivered are not image data, the data divider 11 may divide the data into data items each comprising, for example, part of the data to be delivered and information corresponding to an encryption flag, and these data items may be encrypted in the same manner as TS packets and delivered to the data receiving device.

The invention is not limited to the encryption flag (Transport_scrambling_control) used in the preceding embodiments. Other header information, or several bits at the beginning of the payload, may be used instead.

Those skilled in the art will recognize that further variations are possible within the scope of the invention, which is defined in the appended claims.

What is claimed is:

1. A data delivery device that encrypts video content data and delivers the encrypted video content data to a data receiving device, the data delivery device comprising:

a data divider for setting encryption status information for each data item of the video content data representing a single entity, wherein the setting of the encryption status information is made by assigning encryption status information having values including a predefined value in a predefined cyclic sequence, or by assigning encryption status information having the predefined value to the data items at predefined sequential positions, and wherein the data divider outputs the data items having the encryption status information with the predefined value, as a first set of data items, and the data items having the encryption status information without the predefined value, as a second set of data items;

a first encryptor for encrypting the first set of the data items, without encrypting the remaining second set of the data items, the first encryptor including a first encryption decision unit that uses the encryption status information to decide whether the first encryptor should encrypt each data item;

a storage unit for storing the encrypted first set of data items and the unencrypted second set of data items, pending delivery to the data receiving device; and a second encryptor for encrypting the second set of data items, without encrypting the first set of data items, when they are taken from the storage unit and delivered to the data receiving device, the second encryptor including a second encryption decision unit that uses the encryption status information to decide whether the second encryptor should encrypt each data item.

2. The data delivery device of claim 1, wherein the data items are packets.

3. The data delivery device of claim 1, wherein the data items are transport steam packets.

4. A data delivery system including the data delivery device of claim 1, and the data receiving device that receives and decrypts the data items.

5. The data delivery device of claim 1, wherein encryption conditions, including encryption method and encryption keys used in the second encryptor, are identical to those used in the first encryptor.

6. The data delivery device of claim 1, wherein the second set of data items encrypted by the second encryptor are all different from the first set of the data items encrypted by the first encryptor.

7. A non-transitory machine-readable tangible medium storing an encryption program executable by a computing device in a data delivery device that encrypts video content data and delivers the encrypted video content data items to a data receiving device, the data delivery device including a storage unit, the program comprising:

first instructions for setting encryption status information for each data item of the video content data representing a single entity, the setting of the encryption status information being made by assigning the encryption status information having values including a predefined value in a predefined cyclic sequence or by assigning the encryption status information having the predefined value to the data items at predefined sequential positions, the first instructions outputting the data items having the encryption status information having the predefined value as a first set of data items, and outputting the data items having the encryption status information not having the predefined value as a second set of data items; and second instructions for encrypting the first set of the data items, without encrypting the remaining second set of the data items, the second instructions including a first encryption instruction that uses the encryption status information to decide whether the second instructions should encrypt;

third instructions for storing the encrypted first set of data items and the unencrypted second set of data items in the storage unit awaiting delivery to the data receiving device; and fourth instructions for encrypting the second set of data items, without encrypting the first set of data items, when they are taken from the storage unit and delivered to the data receiving device, the fourth instructions including second decision instructions that use the encryption status information to decide whether the fourth instructions should encrypt each data item.

8. An encryption device included in a data delivery device that divides video content data representing a single entity into a first set of data items and a second set of data items, encrypts the data items, and delivers the encrypted data items to a data receiving device, the encryption device comprising:

a first encryptor for encrypting the first set of the data items, without encrypting the remaining second set of the data items;

a storage unit for storing the encrypted first set of data items and the unencrypted second set of data items, pending delivery to the data receiving device; and a second encryptor for encrypting the second set of data items, without encrypting the first set of data items again, when the encrypted data items of the first set and the unencrypted data items of the second set are taken from the storage unit for delivery to the data receiving device, wherein each data item includes encryption status information, and the first encryptor includes a first encryption decision unit that uses the encryption status information to decide which of the data items should be encrypted by the first encryptor, and wherein the second encryptor includes a second encryption decision unit that uses the encryption status information to decide which of the data items should be encrypted by the second encryptor.

* * * * *